United States Patent [19]

Springer

[11] Patent Number: 5,216,559
[45] Date of Patent: Jun. 1, 1993

[54] CARRIER STRUCTURE FOR READ/WRITE HEADS

[75] Inventor: Gilbert D. Springer, Fremont, Calif.
[73] Assignee: Iomega Corporation, Roy, Utah
[21] Appl. No.: 531,873
[22] Filed: Jun. 1, 1990
[51] Int. Cl.⁵ .......................... G11B 5.596; G11B 5/55
[52] U.S. Cl. .................................. 360/106; 360/78.05; 360/109
[58] Field of Search ....................... 360/106, 109, 78.05

[56] References Cited

U.S. PATENT DOCUMENTS

| | | | |
|---|---|---|---|
| 4,188,645 | 2/1980 | Ragle et al. .................. | 360/109 X |
| 4,414,554 | 11/1983 | Springer . | |
| 4,494,125 | 1/1985 | Springer . | |
| 4,503,439 | 3/1985 | Springer . | |
| 4,503,440 | 3/1985 | Springer . | |
| 4,544,421 | 10/1985 | Springer . | |
| 4,736,353 | 4/1988 | Kasai et al. ................. | 360/78.05 X |
| 4,758,916 | 7/1988 | Niwa et al. . | |
| 4,774,616 | 9/1988 | Kumasaka et al. . | |
| 4,858,040 | 8/1989 | Hazebrouck ................... | 360/78.05 |
| 4,866,555 | 9/1989 | Inagoya et al. . | |
| 4,875,120 | 10/1989 | Takahashi et al. ............. | 360/106 |

*Primary Examiner*—John H. Wolff
*Attorney, Agent, or Firm*—Woodcock Washburn Kurtz Mackiewicz & Morris

[57] ABSTRACT

An electromagnetic read/write head carrier structure is disclosed which permits micro-positioning of the heads carried thereon. The carrier structure incorporates a movable subframe mounted in a floating, friction-free condition on the servo arm of a magnetic media drive. Micro-adjustments in head position for use with high-density data formats are accomplished by micro-positioning the head carrier subframe with respect to the servo arm. A voice coil motor is used to induce relative movement between the head carrier subframe and servo arm.

16 Claims, 3 Drawing Sheets

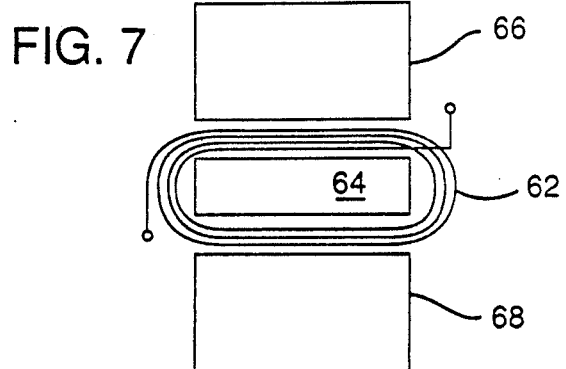
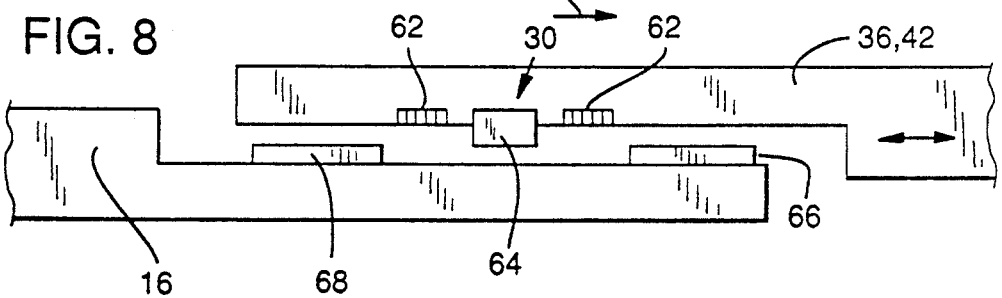
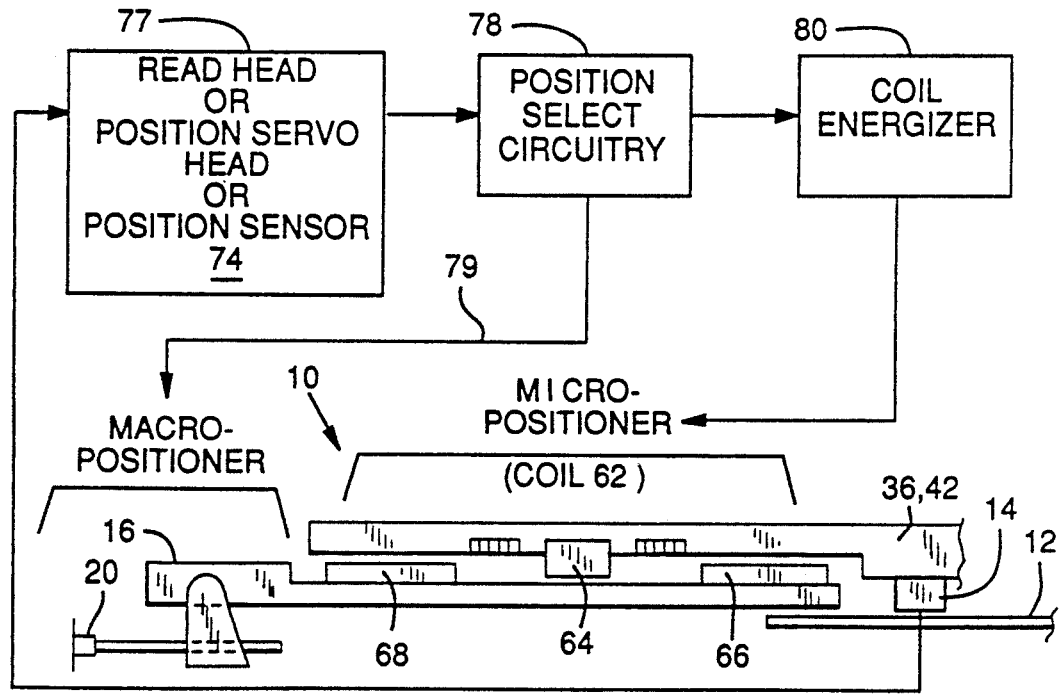

CARRIER STRUCTURE FOR READ/WRITE HEADS

BACKGROUND AND SUMMARY OF THE INVENTION

The present invention relates to electromagnetic recording apparatus and more particularly to carrier structures for positioning electromagnetic read/write heads with respect to moving magnetic media such as magnetic tape or discs. In particular the invention relates to a read/write head carrier structure capable of micro-positioning heads relative to magnetic media to facilitate use of high-density data storage formats.

In several related patent applications I have disclosed techniques for fabricating and producing a new generation of electromagnetic read/write heads capable of utilizing high-density data storage and retrieval formats for magnetic media such as flexible tape or discs. Descriptions of several of my read/write head structures are found in the following patent applications: Ser. No. 07/294,351, filed Jan. 9, 1989, entitled ELECTROMAGNETIC READ/WRITE HEAD, now U.S. Pat. No. 4,984,118; Ser. No. 531,832 filed Jan. 1, 1990, now U.S. Pat. No. 5,122,917, entitled READ-WRITE HEAD ARRAY FOR MAGNETIC MEDIA; and Ser. No. 531,881, filed Jan. 1, 1990, entitled ELECTROMAGNETIC READ/WRITE HEAD WITH ANTI-SIDE-WRITING READ/WRITE GAP. Because my read/write heads are both small and closely spaced, they permit narrower data tracks to be laid down on magnetic media and subsequently retrieved. Data tracks approximately 1- to 1½-mils in width are readily achievable using arrays of my heads, allowing for data track densities of from 600–800 tracks per inch. Current formats used on 3½-inch flexible discs provide track densities of approximately 135 tracks per inch. My proposed high-density format will thus greatly increase the storage capacity of magnetic media.

One enduring problem associated with higher-density media formats is the precision required to position the electromagnetic read/write heads, relative to the adjacent media. Presently-used data formats employ tracks 7–8 mils in width in part to help insure accurate tracking. Relatively wide tracks (7–8 mils) insure a high level of repeatability, allowing individual tracks to be accessed in spite of variations in the dimensions of different media samples, different tolerances and settings when media is transferred from drive to drive and media expansion and contraction due to temperature and humidity.

Accurate, repeatable tracking of significantly narrower data tracks has challenged designers and manufacturers. Consequently, there is a need for a new type of electromagnetic read/write head carrier structure which can make use of a new generation of high-density head arrays to provide a 5- to 7-fold increase in storage densities on magnetic media.

Accordingly, it is an object of the present invention to provide a carrier for a magnetic media read/write head structure which employs conventional head positioning devices, such as those used with current disc drives, for macro-positioning of the heads, and incorporates an additional micro-positioning device on each servo arm to enable the heads to precisely track narrower data tracks for use in higher-density formats.

It is a further object of the invention to provide a means for micro-position adjustment of heads on a servo arm using heads which are supported on a separate subframe mounted in a floating, friction-free condition on the servo arm.

Accordingly, a carrier structure is provided for read/write head structures comprising a first movable subframe, such as an arm, adapted for macro-position adjustment. The carrier structure also includes a second movable subframe for micro-position adjustment, the second movable subframe being mounted in a floating, friction-free condition on the first subframe and structured to carry directly the read/write head structure. And a motor means is provided which is drivingly interposed between the first and second subframes for adjusting the position of the second subframe with respect to the first subframe.

In a preferred embodiment, the second movable subframe is in the form of a head carriage or support platform on which a read/write head structure is mounted. The floating, friction-free mounting is provided by means of a flexure support extending between the first subframe (servo arm) and the second subframe (head carriage). The flexure support permits limited relative movement between the head carriage and the servo arm along a single axis of movement. The motor means drivingly interposed between the arm and head carriage serves as a micro-positioner for inducing relative movement therebetween. The motor means includes a conductive coil on one of the first or second subframes and one or more permanent magnets on the other subframe. The micro-position of the second subframe/head carriage is determined by the magnitude and direction of current passing through the conductive coil. An embodiment employing a pair of carrier structures for accessing opposite sides of flexible magnetic media such as a disc is also disclosed.

DESCRIPTION OF THE DRAWINGS

FIG. 7 is a schematic representation of the micro-positioner motor used in the carrier structure of the present invention.

FIG. 8 is a partial, side, schematic view, on an enlarged scale, of the micro-positioner motor shown in FIGS. 2, 4, 5 and 7.

FIG. 9 is a schematic circuit diagram of the micro- and macro-positioner control system used in conjunction with the present invention.

DETAILED DESCRIPTION OF THE INVENTION

Figure 1:
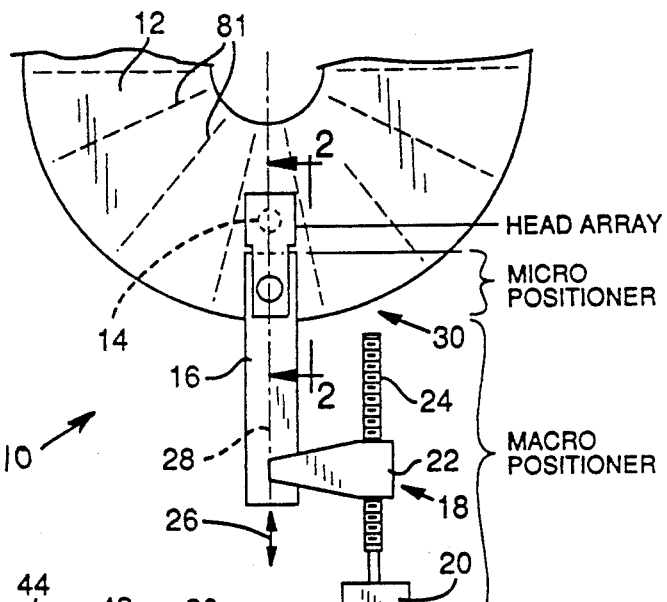
FIG. 1 is a schematic plan view of the carrier structure of the present invention associated with a magnetic disc as used on a magnetic media drive.

With reference to FIG. 1, a carrier structure 10 in accordance with the present invention is illustrated in association with a magnetic disc supported on a media drive (not shown). The magnetic media drive used would be, for example, a flexible (or floppy) disc drive for 3½-inch flexible discs. The magnetic media 12 is illustrated without its customary packaging. The media drive housing, motor and spindle for rotating the media are omitted for clarity. It should be understood that the present invention may be used with flexible disc drives, tape transports and other magnetic media drives which are conventional and thus form no part of the invention. All references herein to magnetic media drives, including references to a "disc drive reading/writing apparatus including a frame," refer to flexible or floppy disc drives or other transports of well known types. One marketer of such disc drives is Mitsumi. References to the frame, or other support parts of the drive, means the part of the drive on which the elements shown in FIG. 1, such as the disc and stepping motor, are supported.

The present invention relates to a head carrier structure 10 which extends adjacent magnetic media 12 and an improved means for micro-positioning a head array structure located generally on the underside of the distal end of the carrier arm. In FIG. 1, the head array is located at position 14, where it contacts the flexible disc media 12. Head array 14 is used to imprint and retrieve magnetic images on the media. A head array suitable for use with the present invention is shown, for example, in my, U.S. patent application Ser. No. 531,832, filed Jan. 1, 1990, now U.S. Pat. No. 5,122,917, entitled UNITARY READ-WRITE HEAD ARRAY FOR MAGNETIC MEDIA, and includes read, write and erase heads, plus a position servo head. No head array is shown in the figures of the present application because the configuration of the electromagnetic heads used with the carrier of the present invention is optional. It will be understood by those skilled in the art that reference to head array 14 means the heads selected by the user or manufacturer to interface with media 12.

The principle support structure for the head array is an arm 16 which, in this example, extends radially inward from the outer periphery of disc 12 in cantilevered fashion. Arm 16 is movable generally radially with respect to disc 12 by means of an indexing or stepping device, termed a macro-positioner in FIG. 1. Macro-positioner 18 can be the same as servo arm positioners presently in use with disc drives and includes a stepping motor 20 to control the position of arm 16 by repositioning a follower 22 on shaft 24. Arm 16 moves fore and aft in the direction of arrows 26. Arm 16 is elongated along its longitudinal axis 28 and is movable along its longitudinal axis. Macro-positioner 18 is designed to position head array 14 in the general region of one or more adjacent selected data tracks on disc 12, the tracks being formed in concentric, non-intersecting patterns. Arm 16 is also referred to as a servo arm, support arm, or a first movable subframe. Macro-positioner 18 is also referred to as the first motor means operatively interposed the frame and first subframe of the carrier structure.

Between head array 14 and arm 16 is a micro-positioner 30, described in greater detail below. Micro-positioner 30, in conjunction with head array 14, arm 16, and the magnetic media drive on which media 12 is carried, serves as a means for precisely accessing a new generation of high-density data tracks, 1- to 1½-mils in width. Use of such high-density tracks will greatly increase the data storage capacity of magnetic media.

Figure 2:
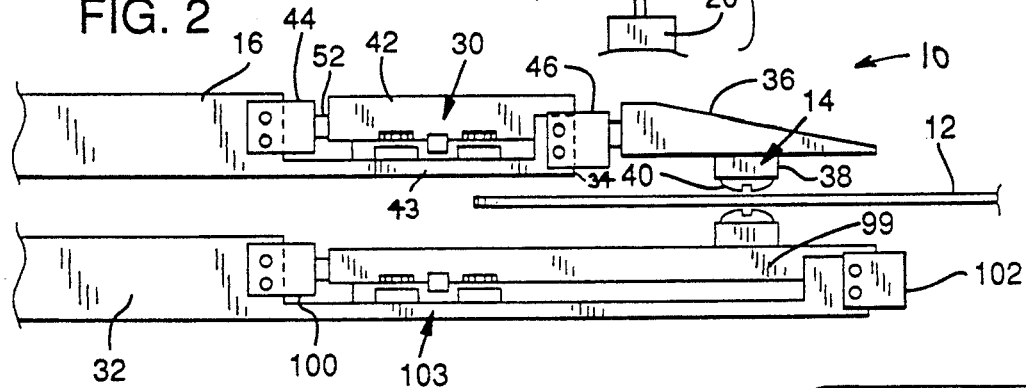
FIG. 2 is a side, partially schematic, fragmentary view on an enlarged scale taken along line 2—2 of FIG. 1, illustrating a pair of the carrier structures of the present invention.

Referring to FIG. 2, the ends of an upper and lower pair of arms 16 and 32 are shown, each forming a part of the carrier structure of the present invention. While the emphasis in the following description will be on the upper arm of the pair, as shown in FIG. 2, it should be understood that in many applications magnetic media is accessed from opposite sides simultaneously. Lower arm 32 performs the same function as upper arm 16, namely, supporting electromagnetic read/write heads in juxtaposition to magnetic media. In the following description and figures, the components associated with upper arm 16 are described in detail for the purpose of illustrating the invention. Lower arm 32 contains the same components as upper arm 16, with limited variations described later. It should be understood that the carrier structure of the present invention can be used with either single or plural head arrays accessing the magnetic media and that the decision to provide a lower arm 32 and associated head array and carrier structures is a matter of design choice.

Figure 3:
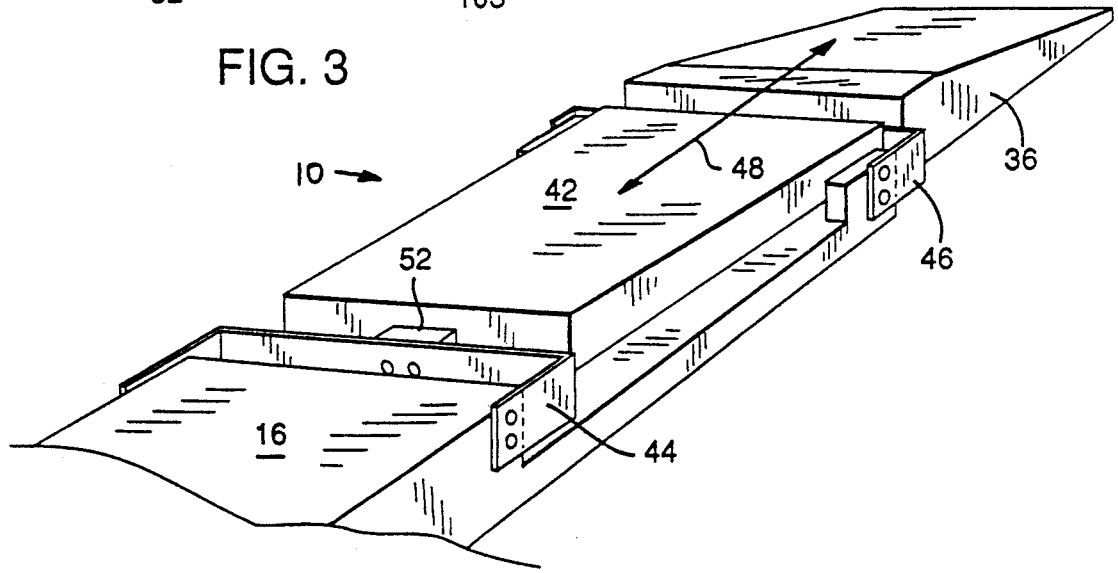
FIG. 3 is a partial, perspective, schematic view on an enlarged scale, of the upper carrier structure and servo arm shown in FIG. 2.

Referring to FIGS. 2 and 3, upper arm 16 extends over media disc 12 and serves as a first movable subframe adapted for macro-position adjustment with respect to the media drive and media 12 thereon. In the illustrated embodiment, arm 16 is movable generally radially with respect to media disc 12, generally fore and aft along the longitudinal axis 28 of arm 16. Macro-positioner 18 (FIG. 1) moves arm 16 relative to the media drive carrying disc 12 to provide access to selected regions of the magnetic media supported on the media drive. Extending beyond the distal end 34 of arm 16 (the first carrier subframe) is a head carriage member 36 which forms a second movable subframe adapted for micro-position adjustment with respect to arm 16. Head carriage 36 supports an electromagnetic read/write head mounting member 38 on its underside (as shown in FIGS. 2 and 3). A head array mounting button 40 extends below member 38 and provides the actual physical support for a head array of the type formed in accordance with my head array invention described in application Ser. No. 531,832, filed Jan. 1, 1990, now U.S. Pat. No. 5,122,917 entitled UNITARY READ-WRITE HEAD ARRAY FOR MAGNETIC MEDIA. Heads which are different from my design would be mounted on mounting member 38 in alternative ways, but would also be located at head array position 14. It will be understood by those skilled in the art that the heads (not shown) will touch the media 12 during operation of the magnetic media read/write system.

The method of mounting the electromagnetic read/write head array 14 on head carriage 36 forms no part of the present invention. Conventional head mountings can be used with the carrier structure, including provision for gimbal mounts, if desired.

Head carriage subframe 36 is coupled to and is movably integral with a plate 42, which partially overlies a portion 43 of arm 16, near the distal end 34 of the arm. Plate 42 and head carriage 36 are supported on arm 16 by a pair of spring members 44 and 46 which are attached at their respective ends to opposite sides of arm 16 and are also attached near their respective centers to carriage 36 and plate 42. Springs 44 and 46 permit limited relative movement (see FIG. 4) between arm 16 and head carriage 36/plate 42 along a single axis of movement depicted generally by arrows 48. Axis of movement 48 is parallel to the longitudinal axis 28 of arm 16.

Figure 4:
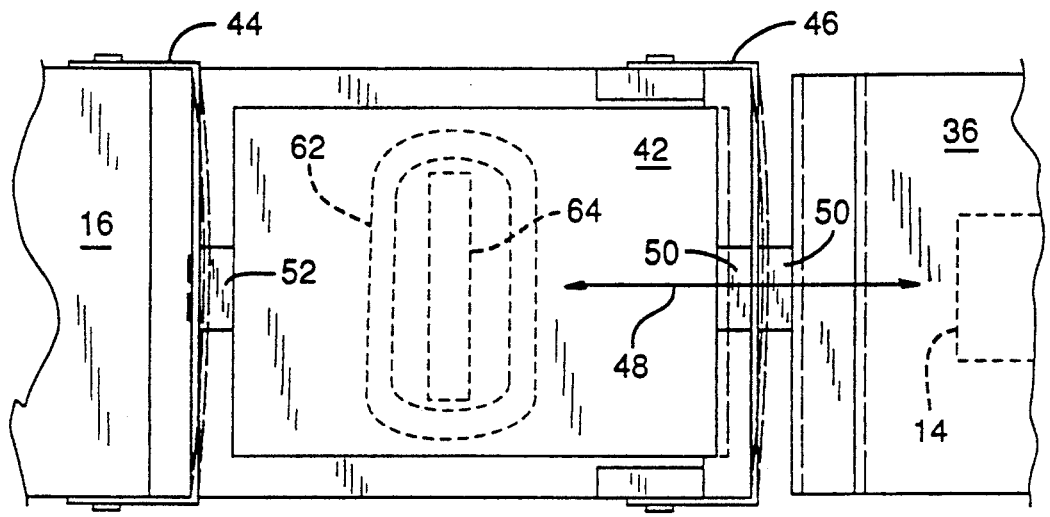
FIG. 4 is a top plan view of the carrier structure shown in FIG. 3 illustrating the operation of the flexure support interconnecting the carrier subframes.

FIGS. 2, 3, 4, 5 and 6 illustrate how the various parts of the carrier structure are attached and move with respect to one another. Head carriage 36 and plate 42 are interconnected by attaching blocks 50, attached to the center of spring 46. The other end of plate 42 is supported by mounting block 52 attached to the center of spring 44. Head carriage 36 and plate 42 together form a single subframe assembly which is movable relative to arm 16 along axis of movement 48. Reference to the "head carriage subframe," "head carriage" or "second movable subframe" will henceforth mean both the head carriage piece 36 and plate 42, which move and are physically tied together. Movement of the head carriage subframe 36, 42, relative to arm 16, results from flexing of springs 44, 46, as illustrated in FIG. 4. Micro-position adjustment of head array 14 is accomplished by such flexing of springs 44, 46.

FIG. 4 illustrates how springs 44 and 46 combine to form a flexure support extending between arm 16 and head carriage 36, 42 for supporting the head carriage on the arm in a manner which permits limited relative movement therebetween along axis 48. Springs 44 and 46, also referred to as spring beams or a spring mechanism, extend transverse to the axis of movement 48 of head carriage 36, 42. Because each spring or spring beam is attached to arm 16 at its ends and is attached to head carriage 36, 42 generally midway between its ends, yielding movement of the springs, in the manner shown in phantom in FIG. 4, permits slight movement of head carriage 36, 42 only in the direction of axis of movement 48. In the other direction, transverse to axis of movement 48, across the width of arm 16, the rigidity of springs 44 and 46 resist movement.

The parallel spring flexure support of the present invention permits micro-position adjustment between the head carriage subframe 36, 42 and arm subframe 16, over a limited range of travel, under floating, friction-free conditions, requiring neither lubrication, bearing surfaces, mechanical contact nor moving parts other than the flexing of springs 44 and 46. I have found the springs to be an effective friction-free mounting compatible with the micro-position adjustments required by the carrier. The maximum travel permitted by the flexure support is approximately 20-mils when the various parts are scaled to correspond to those on a conventional 3½-inch flexible disc drive.

FIGS. 2, 5, 7 and 8 illustrate the parts of the micro-positioner motor means for inducing and causing relative movement between arm 16 and head carriage 36, 42. The micro-positioning motor or motor means 30 is provided between plate 42 and the part 43 of arm 16 overlain by or parallel to plate 42. Motor means 30 includes a coil of conductive wire 62 surrounding an air core 64 embedded within or attached to plate 42 of the head carriage subframe 36, 42. A pair of permanent magnets 66, 68 which flank the central core of coil 62, are supported on or within part 43 of arm 16. The coil and magnets are arrayed along longitudinal axis 28 of arm 16. Magnets 66, 68 are preferably high gauss ceramic or metallic permanent magnets. The north/south orientations of the magnets extend into and out of the page, as viewed in FIG. 7. The polarities of the magnets are reversed from one another. Together with coil 62, the magnets form a typical voice coil which induces movement between the magnets and the coil when current is applied to the coil. Micro-positioning motor 30 is also referred to as a second motor means drivingly interposed the first and second subframes of the carrier structure.

Referring to FIGS. 7 and 8, micro-positioning motor 30 induces relative movement between arm 16 and head carriage 36, 42 to move the head carriage subframe on the arm. Current passing through coil 62 in one direction will set up magnetic fields which produce attraction toward magnet 66 and repulsion from magnet 68. Such a current will cause coil 62 and head carriage 36, 42 to extend outwardly on arm 16 in the direction of arrow 70 (FIG. 8). A current in the opposite direction applied to coil 62 will cause the coil to attract magnet 68 and repel magnet 66, retracting head carriage 36, 42 in the direction of arrow 72.

Micro-positioning motor 30 can adjust the position of head carriage 36, 42 and the head array it carries on arm 16. I have found the motor capable of moving the heads plus or minus (5- to 8-mils) with high accuracy and repeatability, allowing the micro-positioning motor to move the read/write head array over approximately 10-15 high-density data tracks without repositioning arm 16. The performance characteristics of the coil/-magnet micro-positioning servo motor 30 has been found to be essentially linear within the range of movement used. Consequently, an approximately linear relationship exists between the current applied to coil 62 and the position adjustment imparted to head carriage 36, 42.

Figure 6:
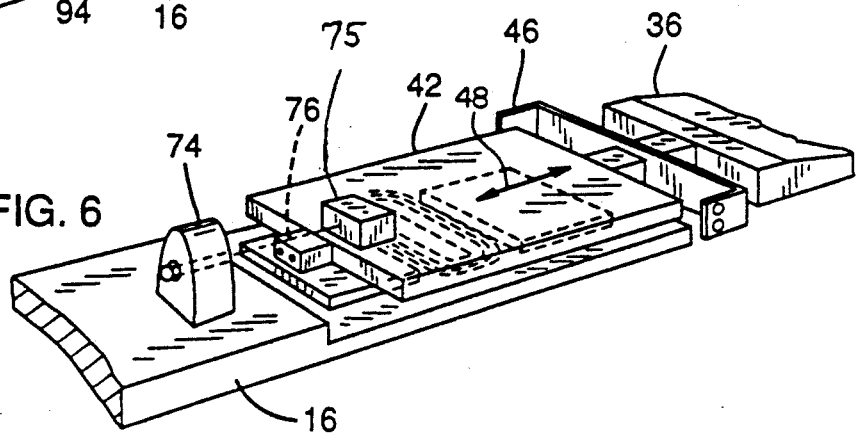
FIG. 6 is a partial, schematic, perspective view of the carrier as in FIG. 5 illustrating a micro-position sensor on the carrier structure.

In certain applications it will be desirable or necessary to accurately determine the position of head carriage subframe 36, 42 on arm subframe 16, without reference to the data tracks on the media. For that purpose, a position sensor can be incorporated into the carrier structure, as shown in FIG. 6. A sensor device 74 attached to arm 16 employs a light beam 76 to measure the position of head carriage subframe 36, 42 relative to the arm. The means for accomplishing such position measurement are conventional. In the sensor I employ, light beam 76 is reflected off a reflector 75 on the head carrier subframe 36, 42 and the intensity of the reflected light is measured to determine distance. Coherent light or electro-mechanical measuring devices may alternatively be used.

The carrier structure of the present invention will be used in conjunction with a macro- and micro-positioning control system which selects and maintains the final position of head carriage 36, 42 on arm 16. A schematic representation of the basic elements of a control system for my carrier structure is shown in FIG. 9. The details of the control system are not part of the present invention, such systems being well within the design capabilities of those skilled in the art of magnetic media data storage devices. My carrier structure for electromagnetic read/write heads provides the mechanical elements for micro-positioning of the heads relative to magnetic media.

With reference to FIG. 9, assuming head array 14 includes the heads of my high-density array disclosed in patent application Ser. No. 531,832, filed Jan. 1, 1990, now U.S. Pat. No. 5,122,917, entitled UNITARY READ-WRITE HEAD ARRAY FOR MAGNETIC MEDIA, the array will have read, write, erase and servo positioning heads. Head array 14 will read the information on the magnetic media, which information includes data track formatting or positioning instructions. Box 77 includes several alternative sources of position information derived from the heads or position sensor on the servo arm. Head position can be detected relative to data tracks on the media by the read head of array 14 or by a servo burst detected by a position servo head included in array 14. Alternatively, position information can be obtained by position sensor 74 (see FIG. 6) if such a sensor is provided on arm 16. The position information from box 77 is supplied to the position selection circuitry 78, which controls the position selection for the carrier 10 and for the media drive. The position selection circuitry receives instructions from external devices such as the computer controlling the media drive, the media drive itself, as well as position information received from the position sensors in box 77. The position select circuitry of box 78 supplies instructions to both the macro-positioner servo motor 20, via line 79, to control the position of arm 16, and to the coil energizer 80 for controlling micro-positioner coil 62. The control circuitry functions as a closed loop which corrects for minor positional variations using conventional tracking techniques.

Utilizing my high-density data track configuration with tracks 1- to 1½-mils in width, it is anticipated that the position control circuitry 78 will reposition arm 16 using stepping motor 20 only when the heads are to be repositioned a distance greater than plus or minus 5 to 8 track widths. Smaller position changes will be accomplished using micro-positioner coil 62. It is anticipated that tracking adjustments or corrections will be made once each data sector on a formated flexible disc. Such sectors are illustrated schematically at 81 in FIG. 1. If, for example, the read head in array 14 senses that it is between data tracks or off-track, the information will be transmitted to the position select circuitry 78 and a micro-positioner adjustment will be made at the next sector break.

Figure 5:
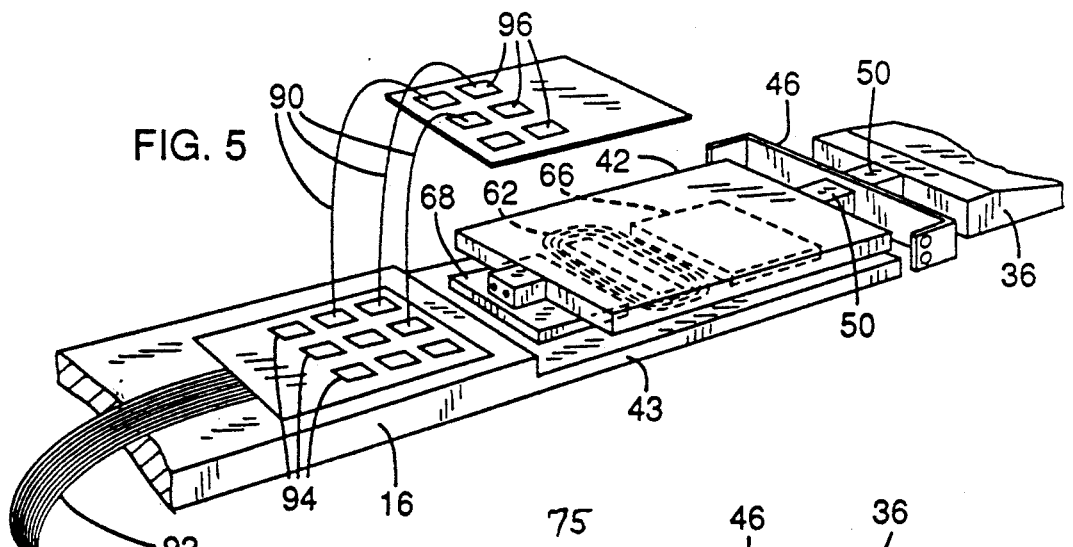
FIG. 5 is a schematic, partially exploded, perspective view of the carrier of FIG. 3, illustrating the location of the micro-positioner motor and the interconnections between the heads, motor and external devices.

Because of the frequent movements between the two subframes (16 and 36/42) of my carrier structure, I have found it preferable not to employ conventional strip conductors for interconnecting the heads in array 14 with external devices. Referring to FIG. 5, interconnections between the head array on head carriage 36, 42 and arm 16 are preferably made by means of twisted pairs of flexible wire strands 90, which connect pads on each subframe. Thus, conventional strip conductors 92, carrying signals to and from the head array and micro-positioning motor 30, are spread to connecting pads 94 on arm 16. Twisted pair wire strands 90 carry the signals to a second set of interconnecting pads 96 mounted on the top of plate 42 (FIG. 5 shows the pads 96 offset for clarity). Connecting conductors are then provided from pads 96 to head array 14 and coil 62 (not shown).

FIG. 2 shows a pair of carrier structures according to the present invention, each of which is mounted on a separate servo arm. As noted above, the detailed description provided above was for the upper carrier structure attached to arm 16. The lower carrier structure attached to lower arm 32 contains all the elements of the upper carrier structure, with some variation in the shape and location of individual elements. Such variations are dictated generally by spaced considerations within the media drive housing. Pairs of such servo arms are used with magnetic media capable of receiving magnetic images on opposite sides, which is true of most flexible disc media.

In a media drive which includes a pair of servo arms incorporating the present invention, the first arm 16 extends over one side of the media and the second arm 32 extends over the other side of the media. First and second carrier structures will be mounted on and include the respective first and second arms 16 and 32. Each of the carriers will include the elements described above with respect to first servo arm 16, namely, the head carriage subframe 36, 42, the flexure support formed by springs 44 and 46 and the micro-positioner motor 30. In most conventional applications, a single macro-positioner 18, including servo motor 20 and related positioning mechanisms, will serve both upper and lower servo arms 16 and 32. Two separate macro-positioner servos may alternatively be used, one for each arm.

Lower servo arm 32 represents an alternative construction for the carrier structure of the present invention. In the embodiment shown in FIG. 2, the equivalent of first movable subframe/arm 16 is arm 32 and the equivalent of second movable subframe/head carriage 36, 42 is the one-piece, elongated subframe 99. The friction-free mounting between the head carriage subframe and the arm subframe is provided by springs 100 and 102. Arm 32 is somewhat longer than upper arm 16 and the head carriage subframe 99 is positioned between flexure springs 100 and 102. The equivalent of micro-positioner motor 30 is motor 103. Interconnecting pads, as shown in FIG. 5, are provided at a suitable location (not shown). A position sensor, as shown in FIG. 6, can also be provided, if required. Particular space considerations might well dictate other alternative arrangements for the mounting of the head carriage subframe on the lower servo arm, such considerations being a matter of design choice within the scope of the present invention. As depicted in FIG. 2, lower servo arm 32 and the associated carrier structure will function in exactly the same manner as the carrier structure associated with upper arm 16.

Other variations are possible within the scope of the present invention. For example, the carrier structure has been described with the micro-positioning motive coil 62 attached to the head carriage subframe 36, 42 and the permanent magnets attached to arm subframe 16. The purpose of motor 30 is to induce relative movement between the arm and head carriage subframes. Consequently, similar induced motion would be imparted by attaching the coil to the arm subframe and the permanent magnets to the head carriage subframe. In its definition, the micro-positioning motor includes a conductive coil on one of either the arm or head carriage subframes and the permanent magnets on the other of either the arm or head carriage subframes. Although the embodiment shown includes a pair of permanent magnets, a single permanent magnet in association with coil 62 would also function to induced relative movement between the subframes. If space or other considerations prevented the use of two springs 44, 46, a single spring or a friction-free flexure mount using three or more parallel springs would be within the scope of the invention.

Alternative types of macro-positioners for servo arm 16, such as the systems used with various types of tape drives, flexible disc drives and hard disc drives, could also incorporate the improved carrier structure of the present invention. For example, in the illustrative embodiment arm 16 is movable radially with respect to disc 12 and the head carriage subframe 36, 42 also moves radially. Thus, the single axis of movement 48 of the head carriage subframe is parallel to and co-linear with the longitudinal axis 28 of arm 16. Other orientations of the servo arm (first movable subframe) could also make use of the carrier structure of the present invention. Disc drives may include sweep-type servo arms which pivot the read/write heads across the disc in the manner of a phonograph. In such a configuration the carrier structure of the present invention would include a head carriage (second movable subframe) which was mounted on the servo arm so that its axis of movement crossed the data tracks on the disc. That might be accomplished by orienting the flexure support springs at an angle relative to the axis of the arm, rather than the generally perpendicular mounting used in the illustrative embodiment. The second subframe would consequently move in a direction different from the direction of movement of the servo arm.

In other embodiments of the present invention, as in the illustrative embodiment shown and described, the purpose of the second movable subframe/head carriage support is to provide a means for micro-position adjustment of the read/write heads relative to the data tracks laid down on the magnetic media. Since the data tracks are laid down in non-intersecting lines, for example, the generally concentric circles on disc-shaped media, it is necessary that the flexure support for the head carriage subframe be oriented on the servo arm subframe such that the single axis of movement of the head carriage subframe intersects the data tracks on the media. Intersection of the data tracks does not necessarily require perpendicular intersection of the data tracks, although perpendicular orientation is advantageous in most applications. The preferred orientation for the direction of movement of both the servo arm subframe and head carriage subframe remains that as shown in the figures of the illustrative embodiment, namely, the longitudinal axis of the arm and the axis of movement of the flexure support for the head carriage subframe oriented generally perpendicular to the data tracks on the magnetic media. In media drives employing disc-shaped media the data tracks are generally concentric circular tracks, consequently, the axis of movement of the flexure support for the head carriage subframe is generally radial with respect to the disc-shaped media. Similarly, in magnetic tape media, the data tracks are generally parallel lines extending lengthwise on the media and the preferred orientation of the flexure support for the head carriage subframe would provide an axis of movement which is perpendicular to the direction of tape movement. Other alternative embodiments and design modifications within the scope of the present invention will occur to those skilled in the art.

A carrier for a magnetic media read/write head structure has been provided which employs conventional head positioning devices, such as those used with current disc drives, for macro-positioning of the heads, and incorporates an additional micro-positioning device on each servo arm to enable the heads to precisely track narrower data tracks for use in higher-density formats. The invention provides a means for micro-position adjustment of heads on a servo arm using heads which are supported on a separate subframe mounted in a floating, friction-free condition on the servo arm.

What is claimed is:

1. A carrier structure for a read/write head structure comprising:
   a first movable subframe adapted for macro-position adjustment;
   a second movable subframe adapted for micro-position adjustment mounted in a floating, friction-free condition on said first subframe and structured to carry directly such read/write head structure; and
   motor means drivingly interposed between said first and second subframes for adjusting the position of said second subframe relative to said first subframe, said motor means being partially on said first subframe and partially on said second subframe so that actuation of said second motor means moves said second subframe in said floating, friction-free condition relative to said first subframe.

2. The carrier structure of claim 1, wherein the means mounting said second subframe on said first subframe includes a spring mechanism.

3. The carrier structure of claim 1, wherein said motor means comprises an electrically energizable coil on one of said subframes, and a permanent magnet structure on the other subframe.

4. In a disc drive reading/writing apparatus including a frame, a carrier structure for a read/write head structure comprising:
   a first movable subframe mounted for movement on and relative to said frame for macro-position adjustment relative to the latter;
   first motor means operatively interposed between said frame and said first subframe for adjusting the position of the latter relative to the former;
   a second movable subframe adapted for micro-position adjustment mounted in a floating, friction-free condition on said first subframe and structured to carry directly said read/write head structure; and
   second motor means drivingly interposed between said first and second subframes for adjusting the position of said second subframe relative to said first subframe, said motor means being partially on said first subframe and partially on said second subframe so that actuation of said second motor means moves said second subframe in said floating, friction-free condition relative to said first subframe.

5. The apparatus recited in claim 4, wherein the means mounting said second subframe on said first subframe comprises a spring mechanism.

6. The apparatus recited in claim 4, wherein said second motor means comprises an electrically energizable coil on one of said subframes, and permanent magnet structure on the other subframe.

7. A carrier structure for a magnetic media read/write head structure associated with a magnetic media drive comprising:
   an arm movable relative to the media drive;
   a macro-positioner for moving said arm relative to the media drive to access selected regions of magnetic media supported on the media drive;
   a head carriage on which a read/write head structure is carried;
   a flexure support extending between said arm and said head carriage for supporting said head carriage on said arm, said flexure support permitting limited relative movement between said head carriage and said arm along a single axis of movement;
   a micro-positioner interposed between said arm and said head carriage for inducing relative movement therebetween, whereby said head carriage is positioned within said limited movement between said head carriage and said arm, said micro-positioner including a conductive coil on one of said arm and said head carriage and one or more permanent magnets on the other of said arm and said head carriage, whereby a current through said coil exerts a force between said arm and said head carriage.

8. A carrier structure as in claim 7 in which in which the head structure reads and writes magnetic images in nonintersecting data tracks on media supported on the media drive, and in which said flexure support is oriented on said arm such that said single axis of movement intersects the data tracks on the media.

9. A carrier structure as in claim 8 in which said arm is elongated along a longitudinal axis thereof and is movable relative to the media drive along said longitudinal axis, and said axis of movement of said flexure support is parallel to said longitudinal axis of said arm.

10. A carrier structure as in claim 9 in which said longitudinal axis of said arm and said axis of movement of said flexure support are generally perpendicular to the data tracks on the magnetic media.

11. A carrier structure as in claim 9 wherein the magnetic media supported on the media drive is disc-shaped and the data tracks thereon are generally concentric circular tracks, and in which said axis of movement of said flexure support is generally radial with respect to the disc-shaped media.

12. A carrier structure as in claim 7 in which said arm is elongated along a longitudinal axis thereof and is movable relative to the media drive along said longitudinal axis, and said axis of movement of said flexure support is co-linear with said longitudinal axis of said arm.

13. A carrier structure as in claim 7 in which said flexure support includes at least one spring beam extending transverse to said axis of movement and said spring beam is attached to said arm and said head carriage for yielding movement along said axis of movement and for rigidity transverse thereto.

14. A carrier structure as in claim 13 in which said flexure support includes a pair of said spring beams mounted in parallel, each said spring beam being attached at its ends to one of said arm and said head carriage and attached generally midway between its ends to the other of said arm and said head carriage.

15. A carrier structure as in claim 7 including a position sensor for sensing the relative position of said head carriage along said axis of movement.

16. A carrier structure as in claim 7 in which the magnetic media used on the magnetic media drive is capable of receiving magnetic images on opposite sides thereof, including a pair of carriers associated with a single magnetic media drive, and in which a first carrier includes a first said arm extending over one side of the media and a second carrier includes a second said arm extending over the other side of the media, the first and second arms being associated with said macro-positioner and the respective first and second carriers each further including said head carriage, said flexure support and said micro-positioner associated with each respective arm.

* * * * *